(12) United States Patent
Ashley et al.

(10) Patent No.: US 6,175,113 B1
(45) Date of Patent: Jan. 16, 2001

(54) THERMAL IMAGING SYSTEM (75) Inventors: Timothy Ashley; Charles T. Elliott; Neil T. Gordon; Ralph S. Hall, all of Malvern (GB)

(73) Assignee: The Secretary of State for Defence in Her Britannic Majesty's Government of the United Kingdom of Great Britain and Northern Ireland, Farnborough (GB)

(*) Notice: Under 35 U.S.C. 154(b), the term of this patent shall be extended for 0 days.

(21) Appl. No.: 09/043,496

(22) PCT Filed: Sep. 24, 1996

(86) PCT No.: PCT/GB96/02347

§ 371 Date: Mar. 27, 1998

§ 102(e) Date: Mar. 27, 1998

(87) PCT Pub. No.: WO97/13358

PCT Pub. Date: Apr. 10, 1997

(30) Foreign Application Priority Data

Oct. 2, 1995 (GB) ................................................ 9520060

(51) Int. Cl.⁷ ........................................................ G01J 5/30
(52) U.S. Cl. ........................ 250/334; 250/332; 250/252.1
(58) Field of Search ................................... 250/334, 332, 250/252.1

(56) References Cited

U.S. PATENT DOCUMENTS

| 3,935,382 | 1/1976 | Hunt . |
| 4,419,692 | 12/1983 | Modisette et al. . |
| 4,561,786 | * 12/1985 | Anderson ............................ 250/339 |
| 4,948,964 | 8/1990 | Gohlke . |
| 5,343,040 | * 8/1994 | Wiese et al. ..................... 250/252.1 |
| 5,354,987 | 10/1994 | MacPherson . |

FOREIGN PATENT DOCUMENTS

| 0 365 948 | 5/1990 | (EP) . |
| 0 550 824 | 7/1993 | (EP) . |
| 2 242 741 | 10/1991 | (GB) . |
| WO 93/24815 | 12/1993 | (WO) . |

* cited by examiner

Primary Examiner—Constantine Hannaher
Assistant Examiner—Andrew Israel
(74) Attorney, Agent, or Firm—Nixon & Vanderhye P.C.

(57) ABSTRACT

A thermal imaging system (10) which is accoupled and by scanning recreates a thermal image by superimposing measured variations in infrared emission from a scene (22) onto a reference level supplied by a light emitting diode (28). The diode (28) is both a positive and negative luminescent emitter. Emitted flux is current controlled to be equivalent to black body radiation at a range of temperatures which may be colder or hotter than ambient. A signal generated with the system (10) switches between scene and diode observation is a measure of the difference between the mean scene temperature and the diode effective temperature. In response to this digital, control means adjust the bias current through the diode (28) in order to reduce the temperature difference. The reference temperature converges towards the mean scene temperature as this process is repeated. Absolute temperature is thus restored and some image defects removed.

32 Claims, 5 Drawing Sheets

THERMAL IMAGING SYSTEM

BACKGROUND OF THE INVENTION

1. Field of the Invention

This invention relates to a thermal imaging system of the kind in which a scene is imaged by scanning.

2. Discussion of Prior Art

Thermal imaging systems are known in the prior art. In principle, infrared radiation emitted by a warm object is directed onto a photoconductive detector (see, for example, Thermal Imaging Systems by J. M. Lloyd, Plenum Press, 1975) and the thermal image is reconstructed from the electrical response. Coverage of a large scene area is generally achieved in one of two ways: imagers either sample simultaneously different sections of a scene or image each component of a scene sequentially. In the former case an array of detectors are used in a "staring" mode and in the latter a mechanical scanning mechanism directs radiation from each pixel of a scene onto a small detector area. A staring array imaging system has the advantage that it lends itself to compactness of design but suffers from many other problems. Detecting elements rarely have uniform detectivities and responsivities, 1/f noise is relatively important and effective cold shielding poses further problems. Scanning thermal imagers, although more cumbersome, offer considerable advantage in requiring simpler and cheaper detector arrays. A third option is to use a combination of both methods, namely, mechanical scanning of a large scene area onto a small array of detectors. Individual scene pixels may be scanned sequentially over a number of detectors, the signals from which are time delayed and integrated in the thermal image resulting in either an improved sensitivity of image or acceptable sensitivity being achieved with faster scan speeds. Furthermore, several pixels may be scanned simultaneously by the use of multiple detectors.

There are considerable differences to be borne in mind when imaging thermal wavelengths as opposed to optical photons. First, optical images are produced primarily by reflection and reflectivity differences, and in this spectral region terrestrial materials tend to have good reflectivities. Thermal images arise from self-emission and emissivity differences and against a terrestrial background radiation contrasts are small and so object resolution is coarse. More effort has to be directed towards improving the contrast within a thermal image. Secondly, although it is electromagnetic radiation which is detected, a thermal image is generally described in terms of temperature. All contributions to the measured irradiance at any point in a scene can conveniently be represented by an effective temperature at that point. This temperature is that at which an ideal black body would emit radiation with the measured intensity.

A major advantage of scanning thermal imagers is that the detector signal can be ac coupled to the signal processing system. Commonly a scene is dissected by raster scanning into a series of parallel lines covering its area. Insertion of a high pass circuit between detector and amplifier eliminates the dc component of a signal and transmits only variations as the scan progresses along a line. This has the advantages of enhancing the contrast, eliminating any variability in the dc offset voltage of different detectors and reducing the effects of detector 1/f noise. Image defects arise however: a step function signal from the detector will be distorted as capacitance within the high pass circuit discharges and the output signal will suffer from droop which in turn causes undershoot as the input step function returns to zero. In addition, the response of a high pass circuit is somewhat dependent on its past history; in a multielement detector it is highly unlikely that all such circuits will have received the same average signal and so channel responses will not be uniform. Furthermore elimination of the dc component also removes the absolute temperature of the scene.

It is advantageous to restore some absolute temperature reference to the image. This can be important if, for example, the horizon is to be seen and for radiometric monitoring of, for example, manufacturing processes. To achieve this and also to counter the image defects of droop, undershoot and channel nonuniformity a prior art technique gives a reference signal to the detector at intervals during the scan. The reference source is typically a convenient passive scene such as the interior of the imager housing although an active source such as a heated strip can also be used. The image is then displayed with the high frequency pixel to pixel variations within the scene superimposed on the dc level provided by the reference temperature.

This method of artificial dc restoration is not ideal if the reference temperature is not close to the scene average. An intermediate frequency variation in temperature will occur as the detector switches between scene and reference source and this will not be immune to the effects of droop and undershoot. Furthermore detector responsivity can vary widely with illumination intensity and so unifying the response of a multidetector system at the reference temperature will not guarantee a consistent response at the scene temperature. Unfortunately this problem is not easily overcome. The situations in which thermal imaging systems are employed are many and varied. Portability is frequently essential and it is not practical to provide as many different temperature reference sources as there are scenes likely to be imaged. An active source requires heating apparatus or more bulky cooling apparatus and the time taken to reach desired temperatures is often prohibitive.

An example of a prior art multidetector scanning thermal imager which primarily addresses the problem of nonuniformity of detector response is disclosed in U.S. Pat. No. 4,948,964. A chopping mirror is arranged such that during the reset portion of the scan, two reference illuminations of differing intensities are incident on the detector array. For this intensity (temperature) change, the gain of each detector is adjusted to ensure that uniform voltage responses are developed. The thermal reference source used is a thermoelectric cooler which, if possible, is adjusted to the approximate average temperature of the scene in order that the gain normalisation is performed within the dynamic range of the imager. This average level provided by the cooler is also used as the clamping level in dc restoration.

Alternative prior art radiation sources, although not disclosed in the context of imaging processes, are disclosed in U.S. Pat. No. 4,561,786 to Anderson and by Bolgov et al. in "IR Sources with Barrier-Free Injection Mechanism", Avtometriya, No. 4, pp 85–88, (1989). The former document discloses use of a light emitting diode (LED) to provide a reference signal which is of equivalent brightness to target (scene) emission at a particular wavelength in constructing a radiometer which is relatively insensitive to surface characteristics of the target being measured. Bolgov discloses a crystal plate of intrinsic InSb coated and etched such that one face of the plate has a high carrier recombination rate ($s_{max}$) and the opposite face has a low recombination rate ($s_{min}$). The Hall effect is then used to concentrate carriers at one or other of the faces. When carriers are concentrated at the $s_{min}$ face, the lower recombination rate results in an above-equilibrium distribution of carriers at this surface and luminescent emission is observed. Conversely, concentration of carriers at the $s_{max}$ face results in the crystal becoming depleted of charge carriers and below-equilibrium radiation emission is observed from the $s_{min}$ face.

SUMMARY OF THE INVENTION

It is an object of the invention to provide an alternative form of thermal imaging system.

The present invention provides a thermal imaging system incorporating a scanning mechanism for scanning an observed scene onto a detecting element and a radiation source arranged to provide illumination of the detecting element at a reference level characterised in that the radiation source is a variable luminescence device (28) of semiconducting material and the system also includes means for adjusting the output radiation intensity from the variable luminescence device to correspond more closely to the mean radiation intensity of the scene under observation and thereby to reduce single-element imaging defects.

The invention provides the advantage that it is capable of providing a reference temperature which is actively adjusted to correspond to the temperature of a scene under observation and so leads to restoration of absolute temperature to a thermal image and reduced image defects.

The variable luminescence device is preferably controllable to readjust the intensity of flux emission to within 10% of a steady state value in settling times of less than ten seconds. The variable luminescence device may be electrically controllable and capable of readjusting the intensity of flux emission to within 1% of a steady state value in settling times of less than one second. Operation within these limits may be provided for if the variable luminescence device is a semiconducting device which in a preferred embodiment is an infrared light emitting diode (IRLED) which is electrically biasable to provide both positive and negative infrared luminescence emission relative to background radiation level and thereby to provide an effective reference temperature which is not restricted to the system environment. This provides capability for rapid adjustments to be made to the reference temperature supplied by the IRLED. Active convergence of the reference temperature towards the scene temperature can be accomplished in as many steps as are necessary with very little limitation imposed by the time taken to adjust the reference source to a new temperature. Prior art imagers using heated strips or thermoelectric coolers as references have unacceptably long waiting times as the reference temperature is adjusted.

Suitable IRLEDs may be fabricated from cadmium mercury telluride or an indium antimonide based material.

The switching means is preferably arranged to switch the detecting element to monitoring the variable luminescence device between intervals of monitoring the scene. In one embodiment the switching means is switchable between a first configuration in which radiation from a scene under observation is incident on the detecting element and a second configuration in which radiation from a variable luminescence device is incident on the detecting element. This provides the advantage that the time for which the detector is idle i.e. monitoring neither scene nor reference is reduced to the time taken to switch between these two configurations only. Separate temperature references incorporated into prior art imagers require switching between a number of configurations as a reference temperature nearest the scene temperature is found and so switching time is increased accordingly.

The switching means preferably possesses scanning capability. This provides the advantage that mechanical scanning of the scene and discontinuous adoption of scene and IRLED observation configurations are facilitated by just one component mirror. Thus the entire imaging system is more portable. Scanning may be two dimensional using either a single mirror or, more commonly, a compound mirror system in which a rotating "drum" controls line scanning and a plane mirror controls the frame scan.

The thermal imaging system of the invention may include control means arranged to supply a bias current to the variable luminescence device. The control means is also arranged to generate a signal corresponding to the difference between mean scene temperature and effective luminescence device temperature when the system is switched from scene to luminescence device observation. In response to this signal it adjusts the bias current and hence the effective temperature of the luminescence device in accordance with the magnitude of the signal and in a direction to reduce said temperature difference. In this way active adjustment of the output of the luminescence device so that it corresponds to the mean scene temperature is carried out automatically by feedback. This requires no manual input or estimate of the scene temperature.

More specifically, the detecting element may be arranged to supply an output signal to a capacitor which in turn is arranged to store the dc component thereof. The control means preferably includes a control circuit arranged to supply a bias current to the variable luminescence device, an integrator arranged to integrate input current and second switching means arranged to direct towards the integrator charge flowing from the capacitor as the stored dc component changes. In this embodiment when the imaging system changes from scene observation to luminescence device observation the switching means provides a signal to the control circuit corresponding to the difference between the mean scene temperature and the effective IRLED temperature. Furthermore the control circuit may be arranged to adjust the current through the infrared luminescence device after each change from scene to luminescence device observation. This provides a means for realising the feedback necessary to adjust the luminescence device emission which can be implemented for little cost.

In a further embodiment the imaging system preferably includes display means arranged to display the ac temperature variations of the observed scene superimposed on the temperature level provided by the infrared emission from the variable luminescence device in order to provide an image with absolute temperature restored. This ensures ease of interpretation of the thermal image.

In a further aspect the present invention provides a method of generating a reference temperature for a scanning thermal imaging system, the method comprising the steps of:

(a) illuminating a detecting element with a reference intensity of infrared radiation from an electrically-controllable variable luminescence device of semiconducting material;

(b) switching between a state of scene observation and a state of reference signal observation and thereby generating a difference signal corresponding to the difference between the mean intensity of infrared radiation emitted by the scene under observation and that emitted by the variable luminescence device;

(c) adjusting the current through the variable luminescence device to reduce the difference signal generated in Step (b) and thereby causing the reference intensity to correspond more closely to that of the mean level of infrared emission from the scene under observation; and (d) reconstructing a thermal image of the observed scene by superimposing the scene variations in temperature on the absolute reference level provided by the variable luminescence device whereby the generated reference temperature actively converges towards the average temperature of the scene being observed and absolute temperature is restored to a thermal image of the scene. Furthermore Steps (b) and (c) may be repeated periodically in order that the intensity of infrared emission from the variable luminescence device approaches the mean emission intensity from the observed scene via a feedback mechanism.

This method of the invention provides the advantage that it restores the absolute temperature to a thermal image of a scene and counteracts some of the image defects caused by droop, undershoot and channel nonuniformity. In addition it lends itself to implementation in fast, portable imagers.

BRIEF DESCRIPTION OF THE DRAWINGS

In order that the invention might be more fully understood, embodiments thereof will now be described with reference to the accompanying drawings in which.

DETAILED DISCUSSION OF PREFERRED EMBODIMENTS

Figure 1:
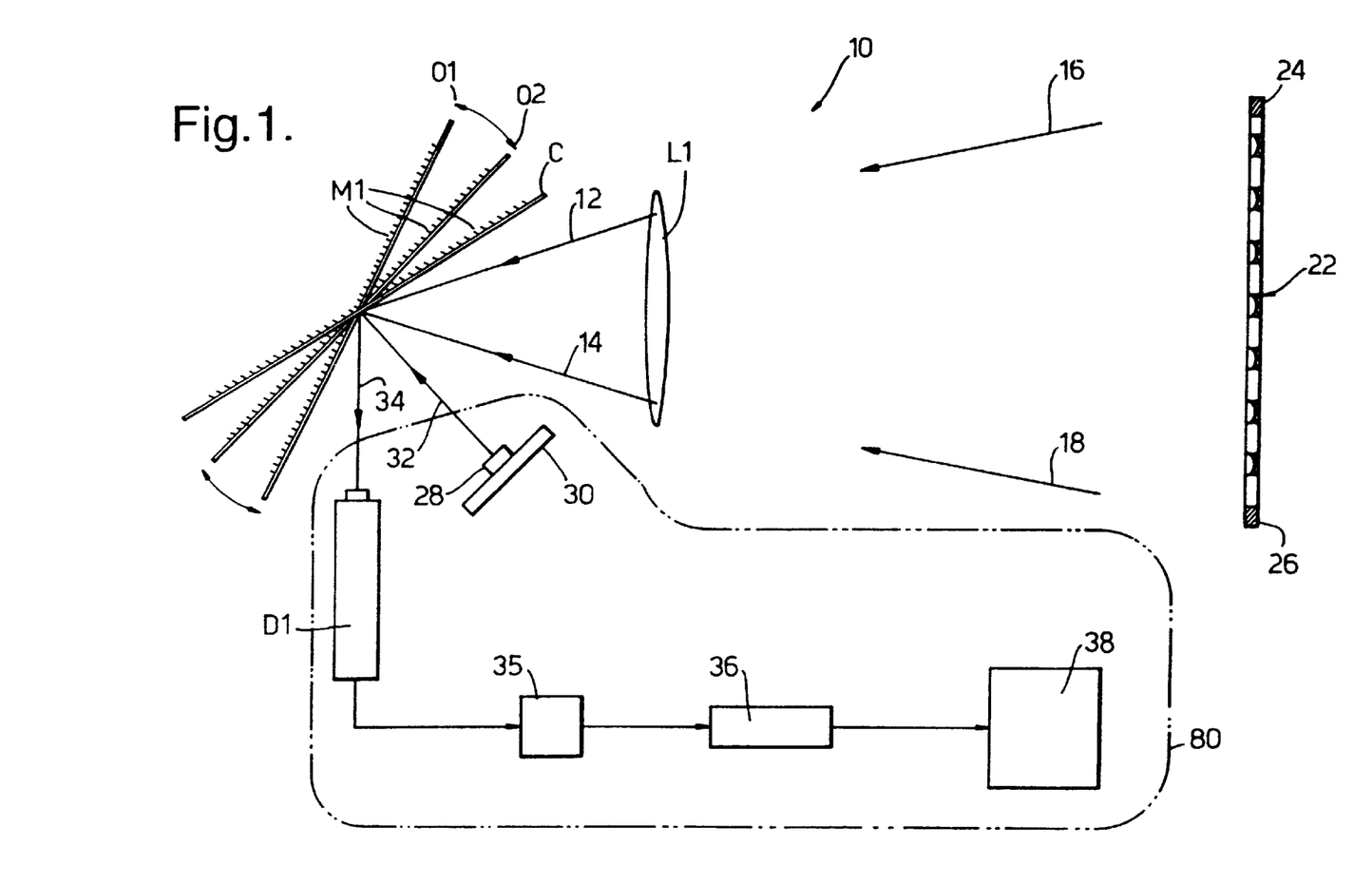
FIG. 1 illustrates schematically a plan view of a proposed mode of operation for restoration of the absolute temperature to a thermally imaged scene using a negative/positive luminescence device.

With reference to FIG. 1, there is shown a plan view of a thermal imaging system indicated generally by 10. The system 10 incorporates an objective lens L1 which focuses infrared (IR) radiation, indicated for example by rays 12 and 14 and thick arrows 16 and 18, onto an infrared photoconductive detector D1. A mirror system M1 either scans through a range of observation positions, defined in the plane of the figure by the extremities O1 and O2 (indicated by grey coloration) or shifts discontinuously to a calibration position C (black). The scanning achieved by the mirror M1 is two-dimensional although, for clarity, neither this nor a compound mirror system are shown in the diagram. A linear representation of a scene being imaged is depicted at 22 and two extreme regions are highlighted at 24, 26. An infrared light emitting diode (IRLED) 28 is mounted on a Peltier cooler/heater device 30. When the mirror M1 is in its calibration position C then IR radiation emitted by the IRLED 28 is reflected from this mirror and reaches the detector D1 as shown by ray path 32, 34. The detector D1 is connected to an electronic processing circuit 35. A computer 36 processes information received from this circuit and passes information to a display apparatus 38. These are conventional infrared imaging items and will not be described further. The components of the system within the boxed area 80 are described in more detail in FIG. 4.

Figure 2:
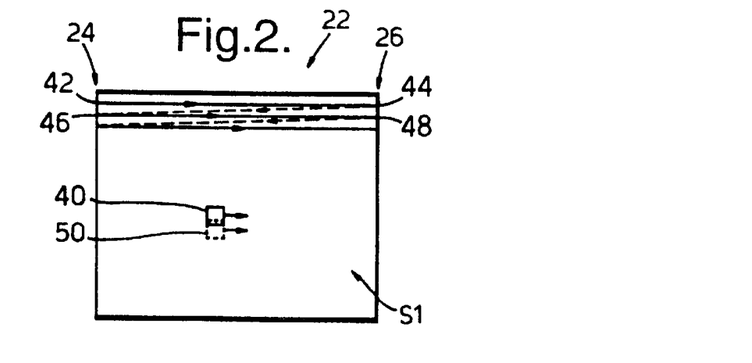
FIG. 2 illustrates schematically a sequence whereby an area is imaged by a scanning thermal imager.

FIG. 2 illustrates the dissection of the two dimensional scene 22 into a series of scan lines. It is a view taken along the central axis of the optical system of FIG. 1 and represents the projection of the detector D1 onto the scene 22 through the mirror M1. The extreme regions 24 and 26 of FIG. 1 are in fact lines corresponding to the horizontal extremes of the scene 22. At any particular instant in time the thermal imager 10 of FIG. 1 images a single pixel area 40. Scan lines are illustrated by horizontal lines 42, 44 and 46, 48. A second single-pixel area 50 illustrates the overlapping of pixels in successive scan lines in order that an entire area S1 is imaged.

Figure 3:
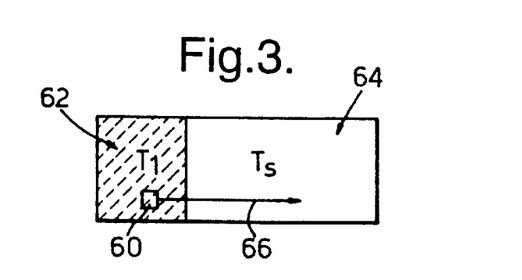
FIG. 3 illustrates schematically an effective composite scene when a reference level is given to an imager after each scan line.

FIG. 3 is a representation of the activity of the imager 10. A pixel 60 identifies the fraction of a scene which is imaged at any particular point in time. An arrow 66 indicates the scanning direction of the imager 10. Two scenes are shown in this figure: a thermal reference source 62 at temperature $T_1$ and a scene under observation 64 at mean temperature $T_s$. The areas shown are illustrative of the proportion of time spent observing each source.

Figure 4:
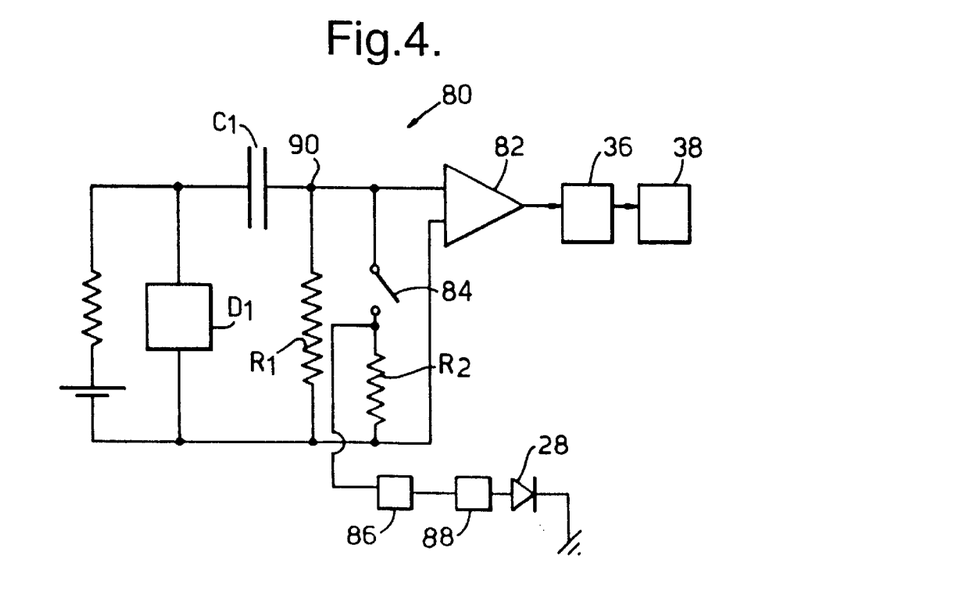
FIG. 4 is a representation of an information processing system of a thermal imager which reconstructs the thermal image in response to output signals from a photoconductive detector.

FIG. 4 illustrates in more detail the detector D1 together with the electronic processing system 80. The output from the detector D1 is input to an RC circuit comprising a coupling capacitor $C_1$ and resistor $R_1$. The output from this circuit is passed to an amplifier 82 and then to the computer system 36 which reconstructs the image in a suitable form for the display apparatus 38. A second resistor $R_2$ has a much smaller resistance than $R_1$ and so when a switch 84 is closed the capacitor $C_1$ discharges through $R_2$. A monitor 86 in conjunction with $R_2$ performs the function of integrating the current flowing through $R_2$ as the capacitor discharges. A control circuit 88 adjusts the current flowing through the IRLED 28 in response to the strength of signal it receives from the monitor 86. In operation, the detector D1 output signal gives rise to a voltage at a point 90 between $C_1$, and $R_1$ or $R_2$, which will be discussed later.

Figure 5A:
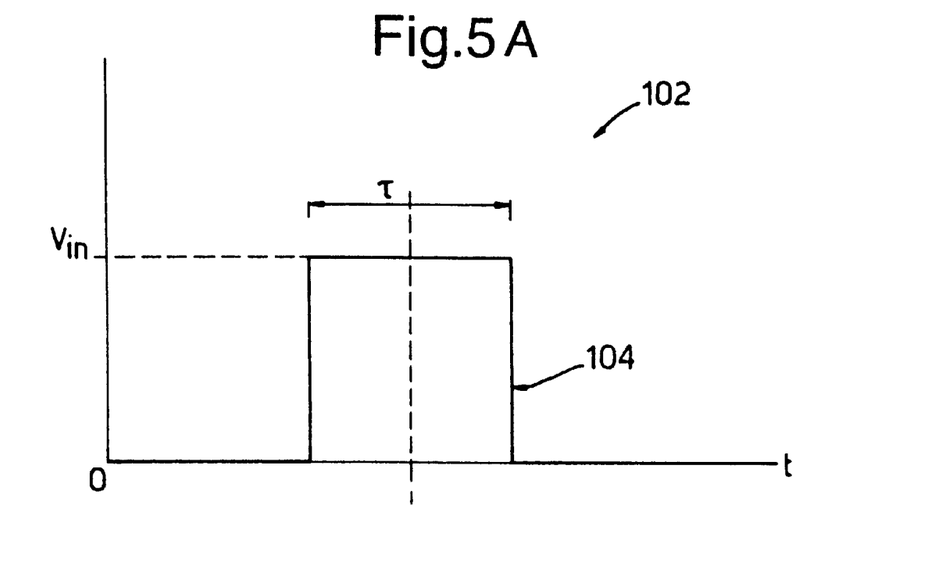
FIGS. 5a and 5b provide two graphs illustrating a step pulse voltage input and corresponding output from a standard series resistor-capacitor circuit.
Figure 5B:
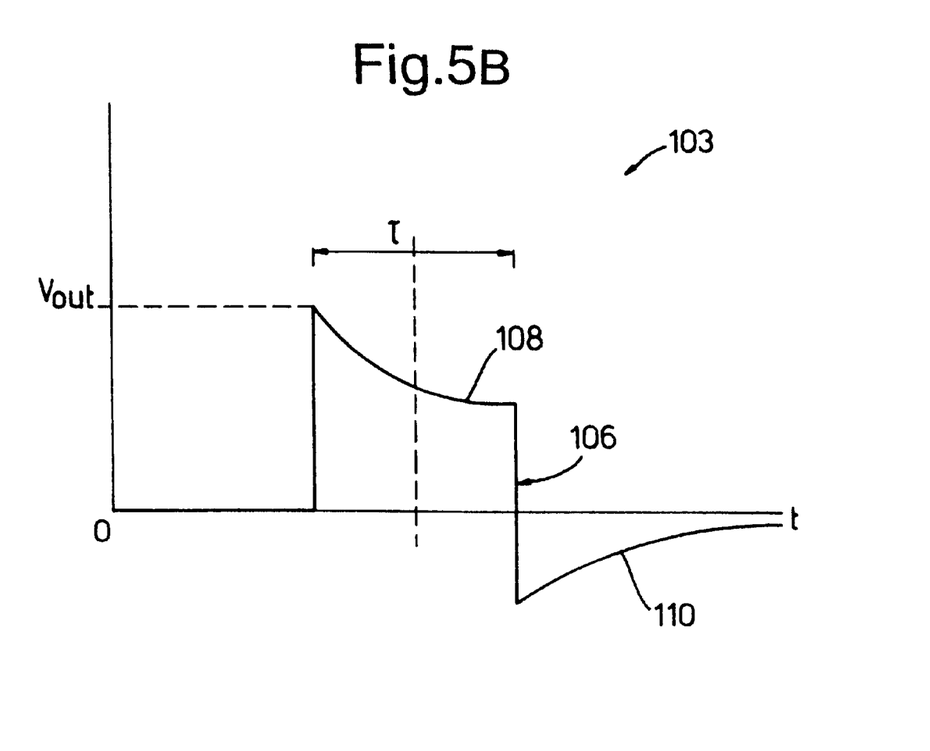

FIG. 5 provides two graphs 102 and 103 illustrating a particular input voltage and corresponding output voltage across the resistor of an RC circuit. A step function input of strength $V_{in}$ and duration $\tau$ is depicted by the line 104. The output voltage with maximum value $V_{out}$ is represented by the line 106. The phenomena of droop and undershoot are illustrated by the sections of the line 106 denoted by 108 and 110 respectively.

Figure 6:
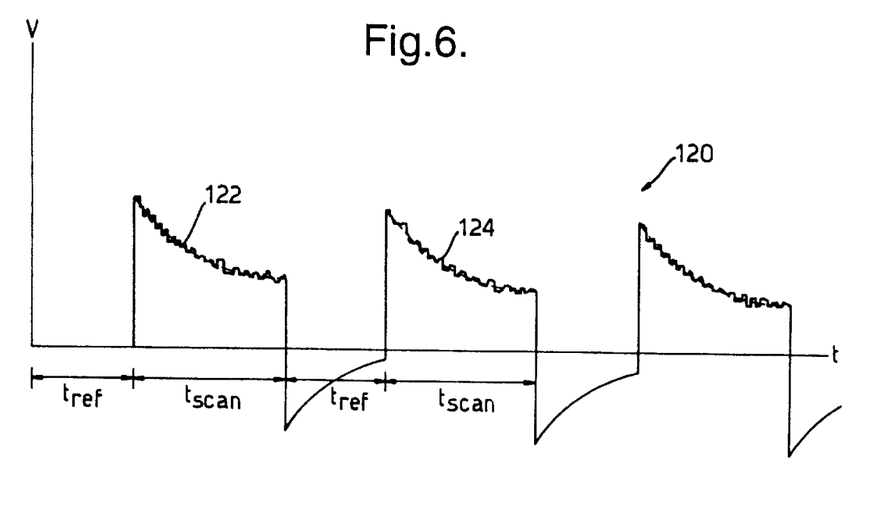
FIG. 6 represents graphically the output voltage across the resistor of an RC circuit which ac couples a detector, when a thermal imager containing the detector is alternately receiving a reference signal and scanning a scene and for which the mean scene temperature is higher than that of the reference.

FIG. 6 represents graphically the behaviour of the voltage at the point 90 of FIG. 4 when the switch 84 is permanently open and the imager 10 alternately views the reference temperature $T_1$ for time $t_{ref}$ and scans the scene at mean temperature $T_s$ for a time $t_{scan}$. The form of the output voltage at 90 (y-axis) is plotted against time (x-axis). Assuming $T_s > T_1$, the voltage curve is indicated generally by 120. Each output step 122, 124 is the result of temperature differences within the scene superimposed on a decaying step output (108 in FIG. 5).

Figure 7:
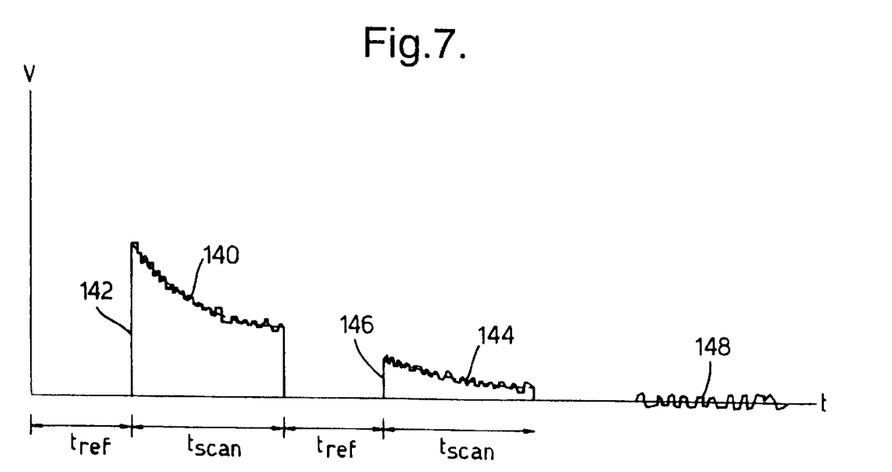
FIG. 7 illustrates the same output as FIG. 6 except, in this case, the temperature of the reference is adapted to match the mean scene temperature.

FIG. 7 represents graphically the behaviour of the voltage at 90 when the switch 84 is operated as described below and the imager 10 alternately views the reference source at temperature $T_1$ for time $t_{ref}$ and scans the scene at mean temperature $T_s$ for a time $t_{scan}$. The switch 84 is open for the time $t_{scan}$ during which the imager scans the scene and closed for the time $t_{ref}$ as the reference temperature is observed. Successive scan lines 140, 144, 148 lead to smaller voltage discontinuities 142, 146 as the IR emission of the IRLED 28 is increased until it corresponds to that emitted from a scene at mean temperature $T_s$.

The mode of operation of the invention will now be described in more detail.

Referring once more to FIG. 1, infrared radiation emanating from a position 24 within the scene 22 is selected by the mirror M1 in position O1 and focused via a path indicated by the arrow 16 and rays 12, 34. Similarly infrared radiation originating from the opposite extreme 26 of the scene 22 is focused onto the detector D1 when the mirror M1 is in position O2 via a path indicated by the arrow 18 and ray 14, 34. In operation, the mirror M1 traverses the range O1 to O2 and this enables radiation originating from all positions between 24 and 26 within the scene to be focused by the lens L1 onto the infrared detector D1. Equivalently, taking the scene as reference, the imager 10 scans across the scene 22 between positions 24 and 26.

This scanning process is illustrated more completely in FIG. 2. Coverage of a two-dimensional scene is achieved by dissecting the area into a series of scan lines. Imaging is not continuous in the vertical direction but the finite size of an imaged area at each point of the scan means that overlap may be arranged between vertically displaced pixels such as 40 and 50. To achieve this area breakdown the mirror system M1 (not shown) is arranged to produce a horizontal scan from position 42 to position 44 followed by a fast reset to position 46. This motion is repeated and a second scan line extends from 46 to position 48. A fast reset then directs IR radiation from a position further down the scene edge 24 onto the detector D1 and the entire scanning process is repeated until the area S1 has been imaged onto the detector D1.

In a situation of radiative equilibrium the IRLED 28 emits as much radiation into its surroundings as it absorbs from them. However this equilibrium situation is disturbed by the application of an electric current. In such a situation the IRLED 28 will either be a net emitter (positively luminescent) or a net absorber (negatively luminescent) of IR radiation. Negative luminescence is a known phenomenon and will not be described further, see P. Berdahl et al. in Infrared Phys. 29(2–4) 667 (1989) and Bolgov et al., referenced herein. For IRLEDs, the mode of operation depends on whether the device is forward or reverse biased. The intensity of IR radiation emitted is dependent upon the bias current magnitude. For any particular value and direction of bias current the IRLED 28 emits IR radiation with an intensity equal to that which would be emitted by a black body at a particular temperature $T_{ref}$. If the IRLED 28 is forward biased then $T_{ref}$ will be hotter than the ambient temperature and if the IRLED 28 is reverse biased then $T_{ref}$ will be colder than ambient. If the current through the IRLED 28 is increased then the flux emitted will be equivalent to that emitted by a still hotter body in the case of forward biasing and by an even colder body in the case of reverse biasing. The IRLED 28 is calibrated so that for any particular value of current flowing and any sense of biasing the intensity of IR radiation emitted or absorbed by the IRLED and hence its black body temperature equivalent are known. The Peltier device 30 serves to hold the temperature of the IRLED 28 stable at the temperature at which its IR emission was calibrated. Alternatively the IRLED 28 is calibrated over the range of temperatures at which the imager is expected to operate which, although increasing the complexity of the calibration process, removes the need for the Peltier device 30.

As is common in scanning thermal imagers, the detector is ac coupled; that is, post-detector electronics respond to and amplify only the changes in observed temperature as the scan progresses. This contrast-only image improves the resolution attainable but loses the absolute scene temperature. To restore some absolute temperature reference to the image a reference signal is given to the detector at intervals during the scan. FIG. 1 illustrates how the imaging system 10 observes a reference signal provided by the IRLED 28 when the mirror M1 is at position C. FIG. 3 illustrates the sequence whereby the imager, via its field-of-view pixel 60, alternately observes a thermal reference source 62 and conducts an active scan of a scene of interest 64. The thermal reference source is the IRLED 28 emitting IR radiation with an intensity consistent with a temperature $T_1$ and the scene of interest has mean temperature $T_s$ although it is the temperature variations about this point which are measured by the imager 10.

FIG. 4 illustrates the processing of signals output from the detector element D1. The ac coupling is provided by the capacitor $C_1$ and resistor $R_1$ which form a high pass filter which attenuates the low frequency component of the output voltage from the detector D1. The high frequency component of this signal (corresponding to pixel-to-pixel temperature differences in the scene) is passed to the amplifier 82 and then to the computer system 36 which reconstructs the image in a suitable form for the display 38. The switch 84 is open when the imager 10 is scanning the thermal scene and closed when the reference signal from the IRLED 28 is observed. The resistor $R_2$ has a much smaller resistance than $R_1$. and when the switch 84 is closed the current flowing through $R_2$ is integrated and held by the integrator 86. The current flow as the system switches from active scanning of the scene to observation of the reference signal occurs when the capacitor $C_1$ discharges (or charges) from a level consistent with the mean scene temperature to a level consistent with the effective temperature of the IRLED 28. If the IR flux produced by the IRLED 28 corresponds to that emitted by a black body of temperature $T_1$ and the mean temperature of the scene is $T_s$ then the integrated current is a measure of the difference between the mean thermal flux from the scene and that from the reference diode which in turn is a measure of $T_s - T_1$. The control circuit 88 adjusts the current flowing through the IRLED 28 in order to minimise this difference. The integrator 86 passes a signal to the circuit 88 the magnitude of which is proportional to the extent to which the two temperatures differ and whose sign indicates whether the reference at $T_1$ is hotter or colder than the scene at $T_s$. The control circuit 88 then adjusts first the current through the IRLED 28 and, if necessary, the biasing direction in order that the reference temperature can be made equal to the mean scene temperature. Thus both the positive and negative luminescence capabilities of the IRLED 28 are exploited and the source and mean scene temperatures can be equalised regardless of whether the scene is hotter or colder than the ambient temperature of the imager.

FIGS. 5b and 5a provide graphs which illustrate the response 103 of an RC circuit (in FIG. 5a) to a step function input voltage 102 (in FIG. 5a). Ideally the input voltage steps from 0 to a value $V_{in}$, remains constant for a time τ and then drops suddenly to 0 as shown by the line 104. The output voltage, as measured across the resistor $R_1$ in FIG. 4, rises quickly to its maximum value $V_{out}$ in response to the input step to $V_{in}$, falls gradually as the capacitor $C_1$ (in FIG. 4) discharges with time constant $R_1C_1$ over the time τ that the input voltage remains constant and then drops by an amount $V_{out}$ to a value below 0. The behaviour of the output voltage is indicated by the line 106. The portion of the line 106 as the voltage falls with time constant $R_1C_1$ 108 is known as droop and the period for which the output voltage is below zero 110 is known as undershoot. Both droop and undershoot degrade the thermal image. Droop can be reduced by increasing the time constant $R_1C_1$ but this increases the duration of undershoot. In this embodiment the time constant $R_1C_1$ is long compared with the time taken to scan a line of the scene (line time) in order to minimise droop.

Consider the point 90 shown in FIG. 4 between $C_1$ and $R_1$ or $R_2$. If the switch 84 is kept open and the imager observes the reference temperature $T_1$ for time $t_{ref}$ and scans the scene at mean temperature $T_s$ for a time $t_{scan}$ then the voltage at point 90 varies as shown in FIG. 6. This figure is a graphical representation of output voltage (y-axis) from the detector D1 observed at the point 90 against time (x-axis). Assuming $T_s>T_1$ the voltage curve, indicated generally by 120, can be explained as follows. As the imager 10 observes the reference temperature $T_1$, there is no variation in the output voltage of the detector D1 and hence no ac component of the RC circuit input. The voltage at point 90 is thus 0 for a time $t_{ref}$. As the imager begins scanning the scene there is a discontinuity in the RC circuit input voltage corresponding to the temperature change $T_s-T_1$. As the scan progresses across the scene, temperature differences within the scene appear superimposed on the decaying step output (108 in FIG. 5b) as shown, 122. At the end of a scan line the imager again observes the reference IRLED 28 and there is another discontinuity in the input voltage corresponding to the temperature change $T_1-T_s$. The voltage at 90 falls below 0 accordingly for time $t_{ref}$ until the imager begins a second scan line 124.

If the switch 84 is operated as follows then the intensity of IR emission from the IRLED 28 is controlled via a feedback mechanism. FIG. 7 represents graphically in the same way as FIG. 6 the voltage at 90. In this case however the effect of feedback which acts to equalise the IR emission from the IRLED 28 and the mean level of that emitted from the scene is included. During the first scan line 140 the switch 84 is held open. On completion of this scan line the switch is closed and current flows through the resistor $R_2$ to reduce the voltage at 90 to 0. The integrated current (or charge) which flows is a measure of the difference $T_s-T_1$, 142. less a fraction lost through droop. This signal is used by the control circuit 88 to adjust the current through the IRLED 28 in such a way that the reference temperature is increased from $T_1$ to $T_1'$. After the next scan line 144 the temperature difference and hence voltage drop at 90 will have decreased to $T_s-T_1'$, 146, again less that due to charge lost through droop. This process continues until the reference temperature provided by the IRLED 28 is equal to the average temperature of the scene under observation, 148. The error introduced to the measured voltage drop by droop becomes less each cycle as can be seen from successive scans 140, 144, 148 in FIG. 7.

The computer 36 receives information describing variations in scene temperature output from the electronics 35 which process the signals from detector D1. It also receives information about the bias current input to the IRLED 28 from the same source. The display is arranged to present the scene variations superimposed on the absolute temperature provided by the IRLED reference which, since the performance of the IRLED 28 is calibrated, is deduced from a knowledge of the bias current. When the difference between the reference IR flux emitted by the IRLED 28 and the mean level emitted from the scene 22 has been minimised then the absolute temperature of the scene is restored to the thermal image irrespective of the temperature of the scene under observation and the image defects resulting from droop and undershoot are reduced.

Figure 8:
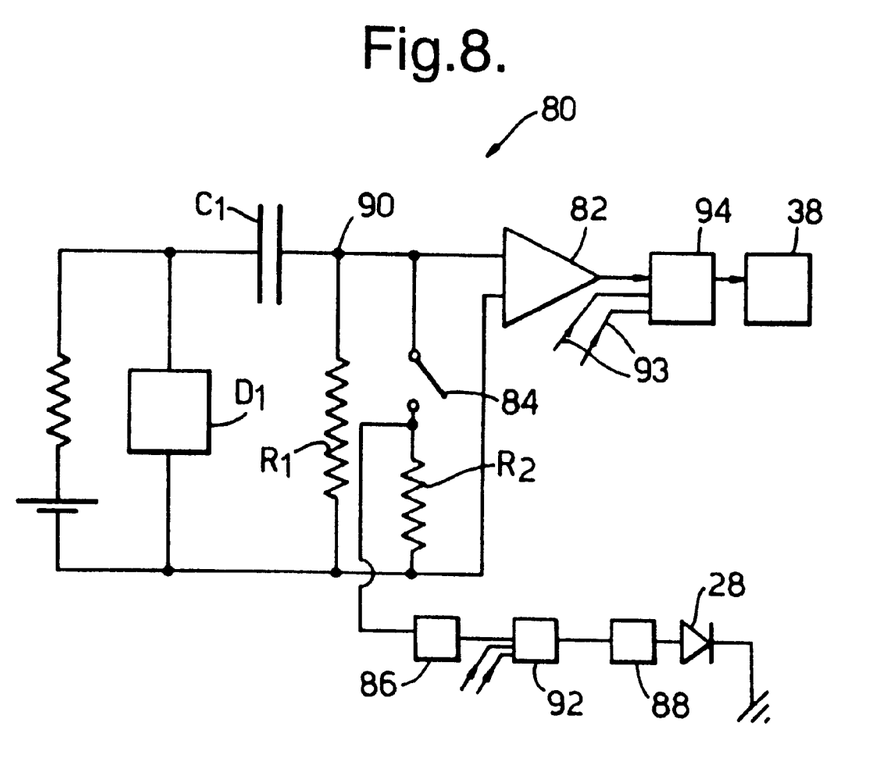
FIG. 8 is a representation of an information processing system of another embodiment of this invention in which the absolute temperature is restored to a thermal image generated when an array of detectors are scanned across a scene.

FIG. 8 relates to a second embodiment of the invention. The figure illustrates schematically the detector D1 as one component of a detector array (not shown), together with its associated electronic processing circuit 80. Each detector of the type D1 is connected to an RC circuit comprising a coupling capacitor $C_1$ and resistor $R_1$. The output from this circuit is input to an amplifier 82. A computer 94 receives signals from this amplifier 82 and also (as indicated by arrows 93) from a number of other amplifiers (not shown) each connected to a respective detecting element of the array and circuit equivalent to that shown. The signals output from the computer 94 are passed to a single display apparatus 38. A second resistor R2 has a much smaller resistance than $R_1$ and so when a switch 84 is closed the capacitor $C_1$ discharges through $R_2$. The current flowing through $R_2$ is integrated and held by an integrator 86. A summation circuit 92 averages signals received from several integrators which function in the same way as 86 and passes the resultant information to a control circuit 88. The control circuit 88 adjusts the current flowing through the IRLED 28 in response to the strength of signal it receives from the summation circuit 92.

In this embodiment a scanning mechanism (not shown) directs infrared radiation from a scene of interest (not shown) onto an array of detectors of the type D1. Like-numbered elements perform the same function as those of FIG. 4. To reconstruct the thermal image from a detector array however the computer 94 processes signals from this amplifier 82 and also from other amplifiers each of which is connected in the way shown in this example to one detecting element of the array. Signals from different detectors are merged by the computer 94 where appropriate and passed to a single display apparatus 38. A single summation circuit 92 receives signals from every integrator such as 86 which is associated with a single detector element such as D1. The signals arising on completion of identical scan lines are averaged by the summation circuit 92 before being passed to the control circuit 88. Each signal corresponds to the difference between the mean temperature of a section of the scene sampled and that of the IRLED reference source. The current through the IRLED 28 is adjusted in order to minimise the average measured temperature difference across all the detectors in the array.

In a further embodiment of the invention digital processing is used to provide the feedback for the IRLED intensity adjustment. Scene information is digitised: the output from each detector D1 is ac coupled via an amplifier and multiplexer to an analogue/digital (A/D) converter. The output from the A/D converter is taken to a frame store. The voltage output when the imager observes the reference IRLED 28 is subtracted from stored voltage outputs along a line of a scene. This provides a measure of the extent to which the current through the IRLED should be adjusted in order that the average output from a detector when viewing the scene is the same as the output when viewing the IRLED. This embodiment provides greater flexibility in that it is capable of matching IRLED output to only portions of a scene rather than the mean emission from the entire area.

What is claimed is:

1. A thermal imaging system (10) incorporating a scanning mechanism for scanning an observed scene onto a detecting element (D1) and a radiation source (28) arranged to provide illumination of the detecting element (D1) at a reference level characterised in that the radiation source is a variable luminescence device (28) of semiconducting material and the system also includes means for adjusting the output radiation intensity from the variable luminescence device to correspond more closely to the mean radiation intensity of the scene under observation and thereby to reduce single-element imaging defects.

2. An imaging system according to claim 1 characterised in that the variable luminescence device (28) is controllable to readjust the intensity of flux emission to within 10% of a steady state value in settling times of less than ten seconds.

3. An imaging system according to claim 1 characterised in that it includes switching means arranged to switch the detecting element (D1) between monitoring the scene and monitoring the variable luminescence device (28) and that device monitoring occurs between intervals of scene monitoring.

4. An imaging system according to claim 3 characterised in that the switching means is switchable between a first configuration in which radiation from a scene under observation is incident on the detecting element (D1) and a second configuration in which radiation from a variable luminescence device (28) is incident on the detecting element.

5. An imaging system according to claim 4 characterised in that the switching means in the first configuration also possesses scanning capability.

6. An imaging system according to claim 5 characterised in that the scanning capability is two dimensional.

7. An imaging system according to claim 1 characterised in that the variable luminescence device (28) is electrically controllable and capable of readjusting the intensity of flux emission to within 1% of a steady state value in a settling time of less than one second.

8. An imaging system according to claim 7 characterised in that the variable luminescence device (28) is a semiconducting device arranged to provide at least one of positive and negative luminescence.

9. An imaging system according to claim 8 characterised in that the variable luminescence device (28) is an infrared light emitting diode (IRLED) which is electrically biasable to provide both positive and negative infrared luminescence emission and thereby to provide an effective reference temperature which is not restricted to the system environment.

10. An imaging system according to claim 7, characterised in that the imaging system (10) includes switching means arranged to switch the detecting element (D1) periodically between monitoring the scene and monitoring the IRLED (28) and also includes control means arranged to supply a bias current to the variable luminescence device (28), wherein the control means is further arranged to generate a signal corresponding to the difference between the mean scene temperature and the effective luminescence device temperature when the system is switched from scene to luminescence device observation and to respond to this signal by adjusting the bias current and hence the effective temperature of the luminescence device in accordance with the magnitude of the signal and in a direction to reduce said temperature difference.

11. An imaging system according to claim 10 characterised in that the detecting element (D1) is arranged to supply an output signal to a capacitor ($C_1$) arranged to store the dc component thereof; the control means includes a control circuit (88) arranged to supply a bias current to the variable luminescence device (28), an integrator (86) arranged to integrate input current and second switching means (84) arranged to direct towards the integrator (86) charge flowing from the capacitor ($C_1$) as the stored dc component changes; wherein the switching means (84) is operative when the imaging system (10) switches from scene observation to luminescence device observation and thereby provides a signal to the control circuit (88) which corresponds to the difference between the mean scene temperature and the effective luminescence device temperature.

12. An imaging system according to claim 11 characterised in that the control circuit (88) is arranged to adjust the current through the variable luminescence device (28) after each switch from scene to luminescence device observation.

13. An imaging system according to claim 12 characterised in that it includes display means (38) arranged to display the ac temperature variations of the observed scene superimposed on the temperature level provided by the infrared emission from the variable luminescence device (28) in order to provide an image with absolute temperature restored.

14. An imaging system according to claim 1 characterised in that the variable luminescence device (28) is an infrared light emitting diode of cadmium mercury telluride or an indium antimonide based material.

15. A method of generating a reference temperature ($T_1$) for a scanning thermal imaging system (10), characterised in that the method comprises the steps of:
 (a) illuminating a detecting element (D1) with a reference intensity of infrared radiation from an electrically-controllable variable luminescence device (28) of semiconducting material;
 (b) switching between a state of scene observation and a state of reference signal observation and thereby generating a difference signal corresponding to the difference between the mean intensity of infrared radiation emitted by the scene under observation and that emitted by the variable luminescence device;
 (c) adjusting the current through the variable luminescence device (28) to reduce the difference signal generated in Step (b) and thereby causing the reference intensity to correspond more closely to that of the mean level of infrared emission from the scene under observation; and
 (d) reconstructing a thermal image of the observed scene by superimposing the scene variations in temperature on the absolute reference level provided by the variable luminescence device
whereby the generated reference temperature actively converges towards the average temperature of the scene being observed and absolute temperature is restored to a thermal image of the scene.

16. A method according to claim 15 wherein Steps (b) and (c) are repeated periodically in order that the intensity of infrared emission from the variable luminescence device (28) approaches the mean emission intensity from the observed scene via a feedback mechanism.

17. A method according to claim 15 wherein the variable luminescence device (28) is an infrared light emitting diode (IRLED) which is electrically biasable to provide both positive and negative infrared luminescence.

18. A method according to claim 17 wherein the variable luminescence device (28) is a light emitting diode of cadmium mercury telluride or an indium antimonide based material.

19. A scanning thermal imager for imaging a remote scene by scanning at least one line of the scene, said at least one line having a mean emission intensity, the imager comprising:

a detector;

a local radiation source having a variable output radiation intensity;

apparatus for directing radiation from said at least one line onto said detector during an imaging phase and from said local radiation source onto said detector during a calibration phase;

a comparator for comparing the mean emission intensity of the at least one line with the output radiation intensity of the local radiation source; and a control apparatus responsive to said comparator for adjusting the output radiation intensity of the local radiation source so that it approaches the mean emission intensity of the at least one line thereby counteracting droop and undershoot effects in the imager.

20. An imager according to claim 19, wherein said at least one line comprises a plurality of lines making up said remote scene.

21. An imager according to claim 20, wherein the comparator comprises:

a capacitor arranged to store a dc component of a signal output by the detector during an imaging phase, an apparatus for discharging the capacitor during a calibration phase; and an integrator arranged to receive and integrate a current generated when the capacitor is discharged.

22. An imager according to claim 20 wherein the output radiation intensity of the local radiation source is controlled by a biasing current.

23. An imager according to claim 22 wherein the control apparatus adjusts the output radiation intensity of the local radiation source by adjusting the magnitude and direction of the biasing current.

24. An imager according to claim 23 wherein it includes display apparatus arranged to display temperature variations of the remote scene superimposed on a temperature level corresponding to the output radiation intensity of the local radiation device in order to provide a thermal image which indicates absolute temperature, and wherein the temperature level corresponding to the output radiation intensity of the local radiation device is derived from the biasing current.

25. An imager according to claim 20 wherein it includes a display apparatus arranged to display temperature variations of the remote scene superimposed on a temperature level corresponding to the output radiation intensity of the local radiation device in order to provide a thermal image which indicates absolute temperature.

26. An imager according to claim 20 wherein the local radiation source is an infrared light-emitting diode (IRLED).

27. An imager according to claim 26 characterized in that the IRLED comprises one of cadmium mercury telluride based material and an indium antimonide based material.

28. A method of thermally imaging a remote scene by scanning at least one line of said scene, said at least one line having a mean emission intensity, said method including the steps of:

(a) directing radiation from parts of said at least one line onto a detector during an imaging phase;

(b) directing radiation from a local radiation source onto the detector during a calibration phase, the local radiation source having a variable output radiation intensity which is controllable by a biasing current;

(c) comparing the mean emission intensity of said at least one line with the output radiation intensity of the local radiation source;

(d) adjusting the biasing current of the local radiation source so that the output radiation intensity thereof approaches the mean emission intensity of the at last one line thereby counteracting droop and undershoot effects in the system; and (e) reconstructing a thermal image of the remote scene by superimposing temperature variations therein upon a reference temperature derived from the biasing current of the local radiation source.

29. A method according to claim 28 wherein said at least one line comprises a plurality of lines comprising said remote scene.

30. A method according to claim 29 wherein steps (b) and (c) are repeated periodically in order that the output radiation intensity of the local radiation source approaches the mean emission intensity from the scene via a feedback mechanism.

31. A method according to claim 29 wherein the local radiation source is an infrared light-emitting diode.

32. A method according to claim 31 wherein the local radiation source is an infra-red light emitting diode comprised of one of cadmium mercury telluride based material and an indium antimonide based material.

* * * * *